United States Patent [19]

Sato

[11] 4,233,686
[45] Nov. 11, 1980

[54] RADIO TUNER FOR COUPLING WITH TAPE RECORDER

[75] Inventor: Masaaki Sato, Hachioji, Japan

[73] Assignee: Olympus Optical Co., Ltd., Tokyo, Japan

[21] Appl. No.: 31,334

[22] Filed: Apr. 18, 1979

[30] Foreign Application Priority Data

Apr. 19, 1978 [JP] Japan .......................... 53/51486[U]

[51] Int. Cl.² .................. H04B 1/08; G11B 31/00
[52] U.S. Cl. ................................ 455/344; 455/348; 455/351; 179/100.11
[58] Field of Search ............... 325/311, 361, 352–356; 343/702; 179/100.11, 100.12 A; D14/68, 14, 20.5, 72.76

[56] References Cited

U.S. PATENT DOCUMENTS

| | | | |
|---|---|---|---|
| 3,916,122 | 10/1975 | Sato et al. | 179/100.11 |
| 4,041,250 | 8/1977 | Sato | 179/100.11 |
| 4,046,973 | 9/1977 | Sato | 179/100.11 |
| 4,064,374 | 12/1977 | Sato | 179/100.11 |
| 4,074,082 | 2/1978 | Sato et al. | 179/100.11 |
| 4,119,813 | 10/1978 | Sato | 179/100.11 |

FOREIGN PATENT DOCUMENTS 2654310 10/1977 Fed. Rep. of Germany ...... 179/100.11

*Primary Examiner*—Robert L. Griffin
*Assistant Examiner*—Jin F. Ng
*Attorney, Agent, or Firm*—Weinstein & Sutton

[57] ABSTRACT

A radio tuner is detachably coupled with a cassette tape recorder having a rectangular form. It includes an L-shaped tuner casing which is adapted to mate with two adjacent, mutually perpendicular sides of the tape recorder. A rod antenna is received within a casing portion which extends along the longer side of the recorder while a ferrite bar antenna is received within another casing portion which extends along the shorter side of the recorder.

18 Claims, 4 Drawing Figures

RADIO TUNER FOR COUPLING WITH TAPE RECORDER

BACKGROUND OF THE INVENTION

The invention relates to a radio tuner for coupling to a cassette tape recorder, and more particularly, to a radio tuner of the type which can be detachably coupled to a small size cassette tape recorder.

Recently, a trend toward decreasing the size of a cassette tape recorder and an increasing popularization of a portable radio set have resulted in a unitary combination of both units, a variety of which are available on the market. The presently available combined radio set and tape recorder units are relatively large in size, in many instances several times larger than a small size tape recorder, inasmuch as they are a simple assemblage of both units into a unitary construction. Heretofore, none of these units has been pocket size.

The owner of the present invention has previously proposed a miniature cassette tape recorder which employs a so-called "micro-cassette" tape and which is pocket size. These tape recorders have been detachably coupled with a compact radio tuner which utilizes the battery, loudspeaker, amplifier or any other appropriate component of the tape recorder. However, one problem of such a combination is that a rod antenna of a substantial length which is used to receive FM or shortwave broadcasting cannot be housed within the tuner together a bar antenna of a short length which is utilized for reception of AM broadcasting. Although the rod antenna may be disposed on the exterior of the miniature tuner, an externally mounted rod antenna affects the size and configuration of the tuner and recorder combination, thereby making it more difficult to provide a pocket size tuner and recorder combination.

The owner of the present invention has also previously proposed a radio tuner set which can be detachably coupled with a tape recorder and which includes a rod antenna mounted on one side of an tuner casing so that it extends along the adjacent side of the tape recorder. However, in this combination, the FM reception rod antenna remains exposed externally when the combination is not in use, thereby detracting from the appearance of the combination and increasing the possibility that the antenna may be damaged.

It is desirable to improve the reception sensitivity by having both the rod antenna and the bar antenna as long as possible. However, the very purpose of providing a pocket size radio set and tape recorder combination will be defeated if the tuner casing must be increased in size or must be provided with a lateral projection in order to accommodate the antennas.

SUMMARY OF THE INVENTION

It is an object of the invention to eliminate the above-described disadvantages by providing a radio tuner which can be detachably coupled with a cassette tape recorder in such a manner that the radio tuner utilizes the source battery, amplifier, loudspeaker or any other component of the tape recorder and which can be used to receive a plurality of bands of radio signals. In one embodiment of the invention this object is accomplished by providing an L-shaped tuner casing which is adapted to be coupled with two adjacent, mutually perpendicular sides of the tape recorder and in which an AM broadcast receiving bar antenna and an FM or short wave (SW) broadcast receiving rod antenna are disposed.

It is another object of the invention to provide a radio tuner having a tuner casing which can be detachably coupled with a cassette tape recorder and which internally houses a bar antenna and a rod antenna, both of which can be made longer than the adjacent corresponding sides of the tape recorder.

In accordance with one especially advantageous embodiment of the invention, the radio tuner has an L-shaped casing which is adapted to be coupled with two adjacent sides of the tape recorder. A telescopic rod antenna is disposed within the long leg or casing portion of the casing and a bar antenna is disposed within the short leg or casing portion of the casing. By telescoping the rod antenna to its minimum length, it can be substantially completely housed within the casing when not in use, thus avoiding the likelihood that it may be folded, broken or otherwise damaged. If the length of the long leg of the casing is greater than the length of the tape recorder and the length of the short leg of the casing is greater than the width of the tape recorder, the length of the antennas can be correspondingly increased to improve the reception sensitivity of the tuner.

DESCRIPTION OF PREFERRED EMBODIMENT

Figure 1:
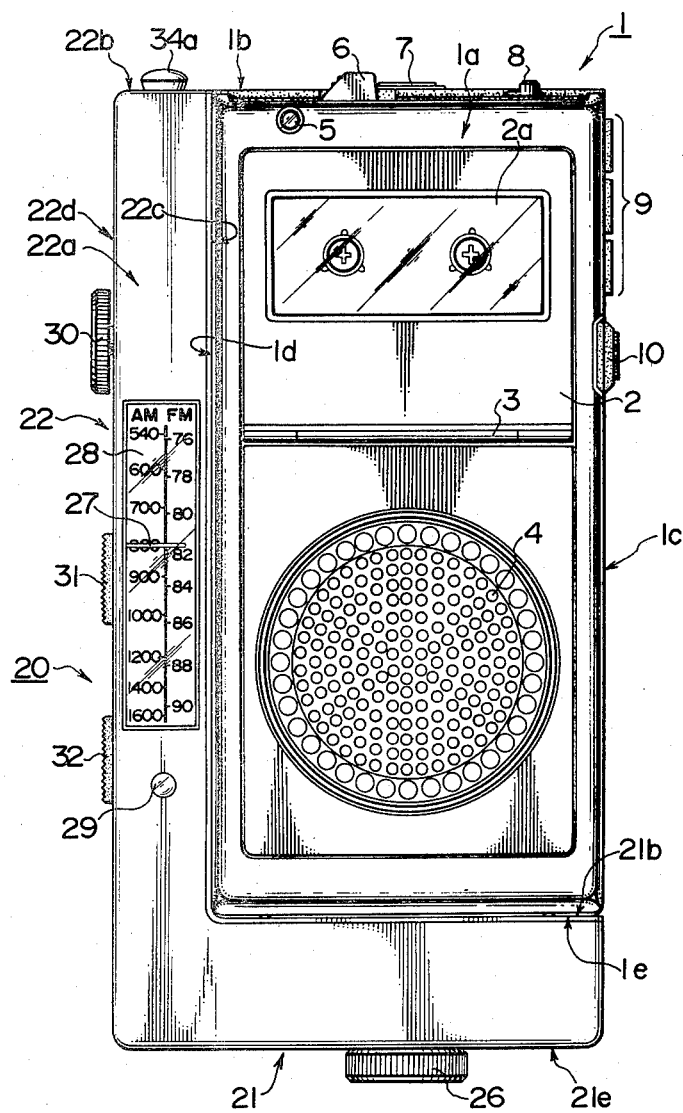
FIG. 1 is a front view of a radio tuner according to one embodiment of the invention as coupled with a tape recorder.

Referring to FIG. 1, there is shown a radio tuner of the invention which is detachably coupled with a miniature cassette tape recorder employing a "micro-cassette" tape developed by the owner of the present invention. As shown, a tape recorder 1 has a rectangular housing, most of which is covered with a metallic coating such as a sheet of aluminium. Formed in its front surface 1a is a tape cassette receiving chamber which is covered by a lid 2 provided with a transparent sight window 2a. The lid 2 is pivotally connected to the housing by a hinge 3. The sight window 2a permits a running condition of an individual to observe the tape contained within the loaded cassette. A number of small apertures 4 are formed in the front surface 1a at a position below the lid 2 and are located to correspond to the opening of a loudspeaker (not shown) which is internally housed within the tape recorder. Another sight window 5 for a battery checker and record mode indicator lamp is disposed along the upper edge of the front surface toward the left-hand end. The housing also has a top edge 1b in which are located an operating knob 6 which enables a tape rewind, rapid advance or the like; a grille associated with an internally housed microphone; and a power switch 8. The housing also includes a right-hand sidewall 1c, in the upper region of which is disposed a group of operating buttons 9 which are used to establish a record or playback mode or or stop the tape recorder 1. A knob 10 is disposed in the right-hand sidewall at a location directly below the group of buttons 9 for opening or closing the lid 2 and for ejecting the loaded cassette.

Figure 2:
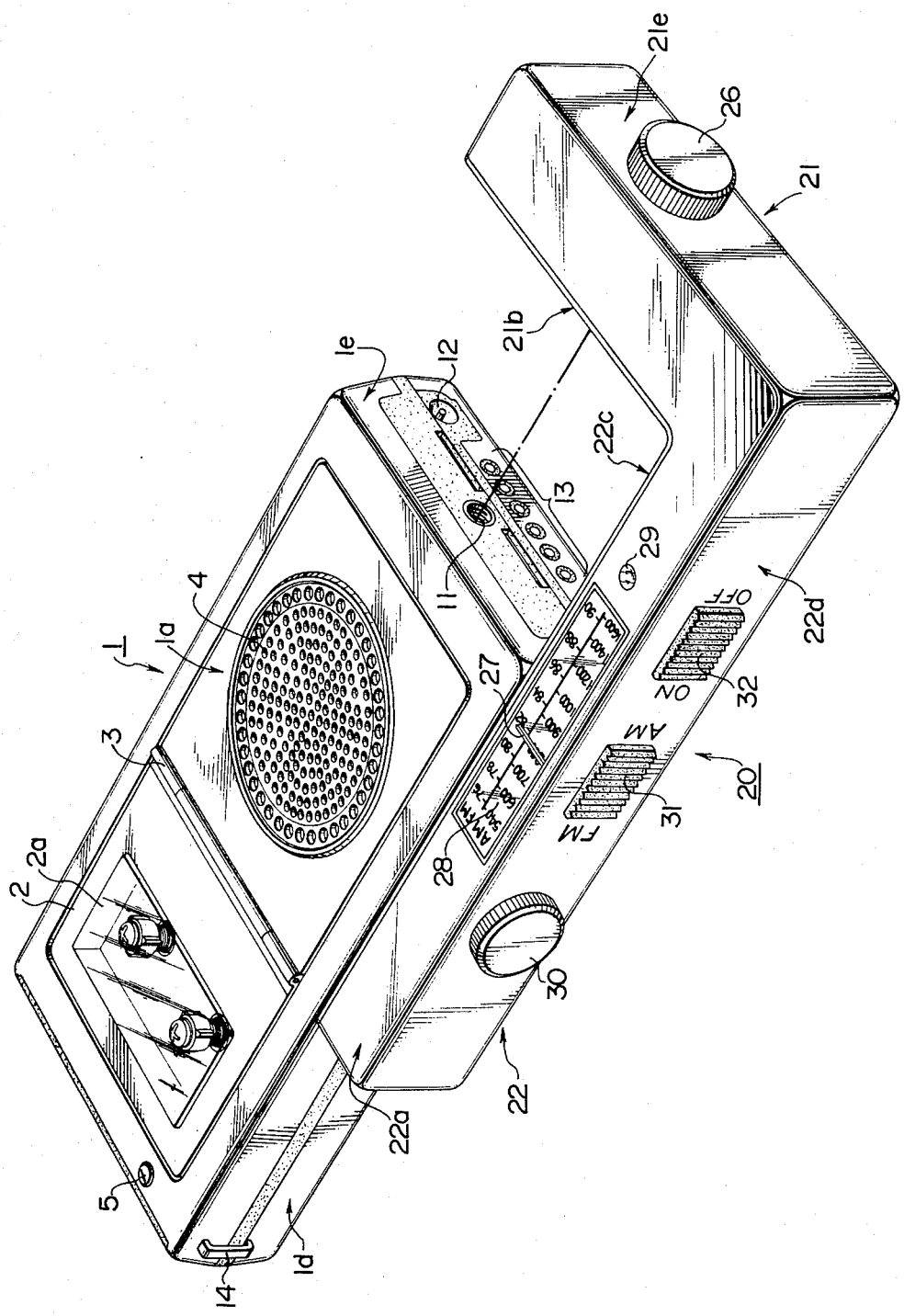
FIG. 2 is a perspective view of the radio tuner and miniature cassette tape recorder shown in FIG. 1, illustrating the manner of coupling therebetween.

Referring to FIG. 2, the bottom wall of the tape recorder 1 is formed as a mating surface 1e which is adapted to be coupled with a tuner 20 by abutting engagement with a corresponding mating surface 21b of the latter. To facilitate the abutment, surface 1e is formed as a convex, curved surface having a generally centrally located threaded bore 11, which is engaged by an interconnecting threaded bolt which couples the tuner 20 with the tape recorder. Toward the right-hand end, the surface 1e is provided with a jack 12 for connection with an A.C. adaptor. A series of electrical contacts 13 are disposed in the lower portion of the curved surface 1e for allowing an interconnection between the electrical circuit of the tape recorder 1 and that of the tuner 20.

The left-hand wall of the tape recorder 1 is formed as a mating surface 1d which is shaped for engagement by a mating surface 22c formed by an inner wall of a vertical casing portion 22 of the tuner 20 in order to stabilize the connection between the mating surfaces 1e, 21b. A ring-shaped detent piece 14 is secured to the upper end of the mating surface 1d to limit the upward movement of the casing portion 22a along the mating surface 1d. When the tape recorder 1 is used alone, the detent piece 14 may be utilized to attach a suspension strap thereto.

The casing of the radio tuner 20, which is detachably coupled with the tape recorder 1 having an elongate rectangular shape, is formed of an electrically insulating material, such as plastics. The tuner casing is L-shaped as mentioned above, having both horizontally and vertically extending casing portions which are shaped to abut against the mating surfaces 1e, 1d, respectively, which represent the shorter and the longer side of the tape recorder 1. The inner wall of the horizontal casing portion 21 is formed as a mating surface 21b which is adapted to abut against the mating surface 1e while the inner wall of the vertical casing portion 22 is formed as the mating surface 22c which is adapted to abut against the mating surface 1d. Both of the mating surfaces 21b, 22c are shaped so as to conform with the shape of the mating surfaces 1e, 1d, respectively, of the tape recorder 1. Thus, when the tuner 20 is coupled with the recorder 1, the length and the width of the combined assembly will increase by an amount corresponding to the width of the horizontal and vertical casing portions 21, 22 of the tuner 20 while the thickness of the entire assembly remains unchanged.

Disposed within the casing portions 21, 22 is the electrical circuit of the tuner which includes a high frequency amplifier, frequency mixer, local oscillator, intermediate frequency amplifier and detector for both AM and FM bands. The tuner shares a source battery, a loudspeaker and an audio amplifier (all of which are not shown) with the tape recorder 1.

Figure 3:
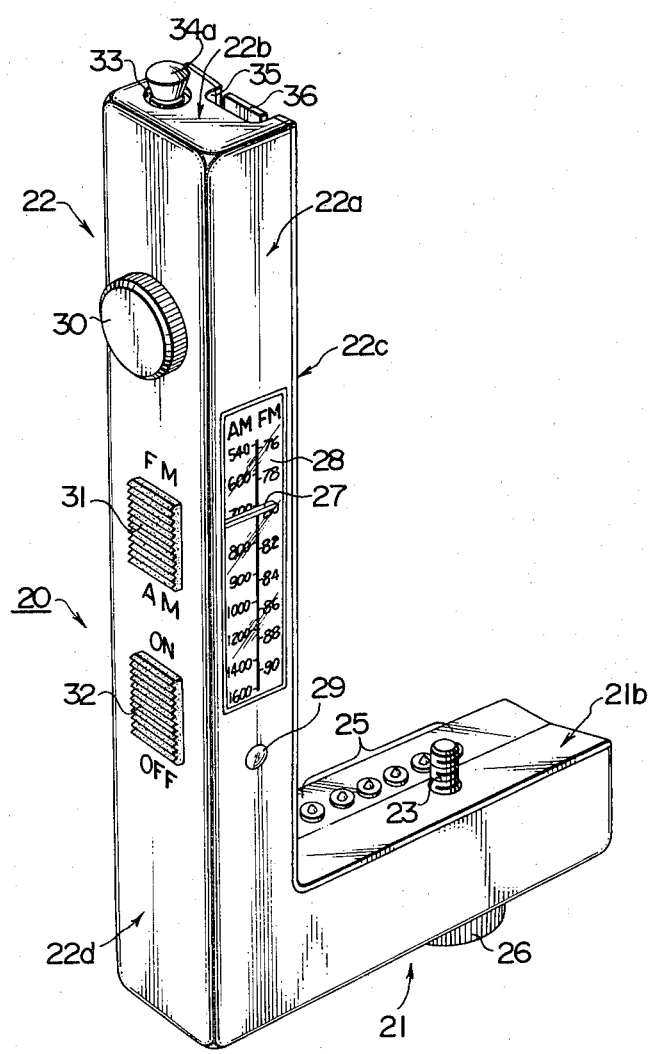
FIG. 3 is a perspective view of the radio tuner shown in FIG. 1.

As shown in FIG. 3, the mating surface 21b of the horizontal casing portion 21 is shaped as a concave, curved surface for engagement with the mating surface 1e of the tape recorder 1. An interconnecting threaded bolt 23 extends through the horizontal casing portion 21 and projects from the mating surface 21b for engagement with the threaded bore 11 (see FIG. 2) formed in the mating surface 1e of the tape recorder 1. In addition, a group of electrical contacts 25 is disposed in the mating surface 21b for mating engagement with the group of electrical contacts 13 (see FIG. 2). The outer end of the threaded bolt 23 projects through the outer bottom wall 21e (see FIG. 2) of the casing portion 21 and is connected with a knob 26, which can be turned to engage the bolt with the threaded bore 11.

The vertical casing portion 22 of the tuner 20 includes a front surface 22a on which an AM and FM tuning dial 28 is disposed to cooperate with a pointer needle 27. Also a lamp 29 is disposed in the surface 22a to indicate the operation of the radio set. The casing portion 22 also includes an outer wall 22d in which are disposed a knob 30 for moving the pointer needle 27, a switch button 31 for switching between AM and FM bands, and a radio on-and-off switch 32, all of which are vertically aligned. The casing portion 22 has a top edge 22b in which a vertically extending passage 33 is formed to receive a rod antenna 34. Normally, the rod antenna 34 is telescoped to its minimum length so as to be entirely received within the casing portion 22 except for its head 34a which projects beyond the casing. In the region of its corner which joins with the mating surface 22c, the upper edge 22b is partly removed to form a notch 35, into which a detent piece 36 extends for engagement with the detent piece 14 provided on the tape recorder.

Figure 4:
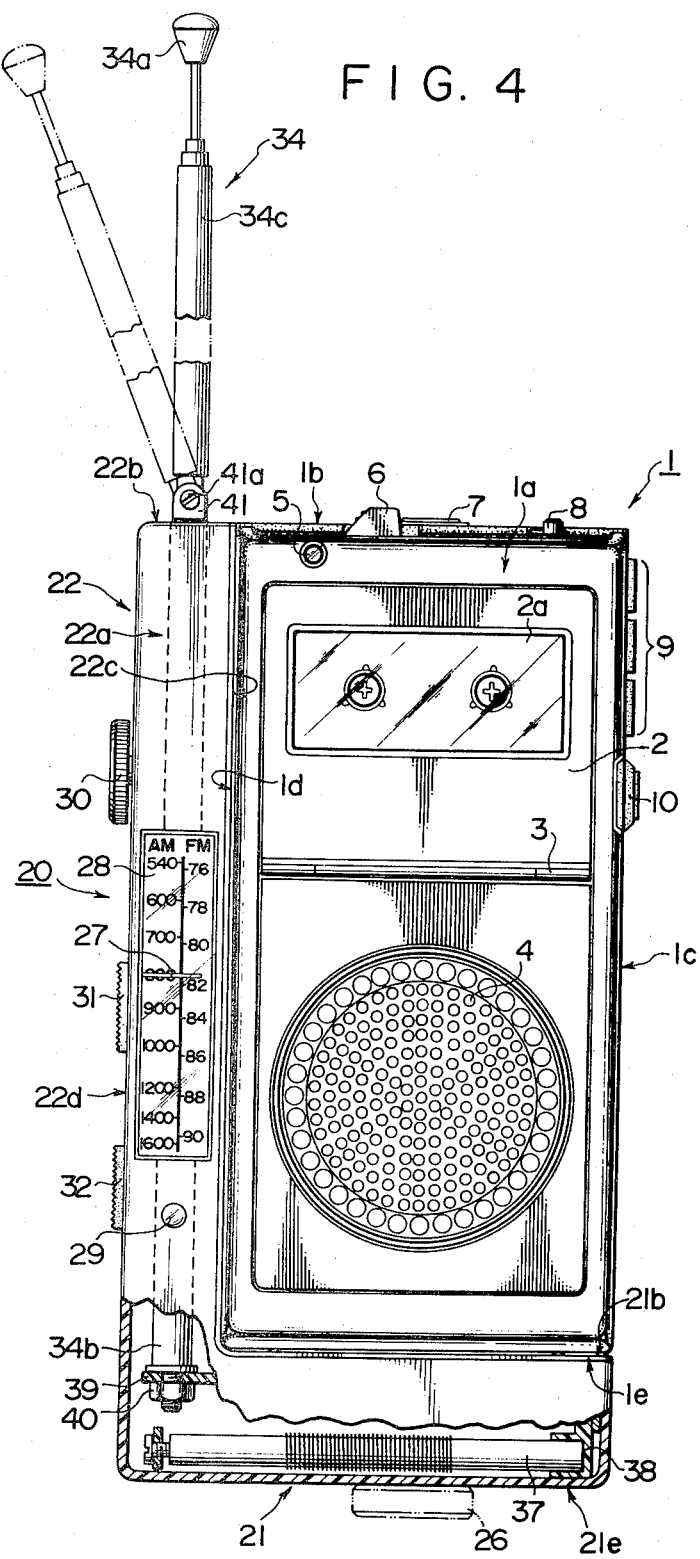
FIG. 4 is a front view of the tuner coupled with the cassette tape recorder as shown in FIG. 1, illustrating the rod antenna in use, with the tuner being partly broken away to show the interior thereof.

Referring to FIG. 4, a ferrite bar antenna 37 for reception of AM band radio signals is shown disposed within the horizontal casing portion 21. The bar antenna 37 is supported in the interior of the horizontal casing portion by by a support member 38 supports the bar antenna 37 adjacent to the bottom wall 21e of the horizontal casing portion and in parallel relationship thereto. In this manner, the bar antenna 37 is disposed along the mating surface 1e which represents the shorter side of the recorder 1. While such bar antenna is in itself well known, it should be noted that it has a length which is greater than the dimension of the shorter side of the recorder 1 and is located at a maximum distance from the recorder 1. The increased length and the location of the bar antenna 37 improves the reception sensitivity by minimizing the shielding effect created by the metallic housing of the tape recorder 1. It is also to be noted that such disposition of the bar antenna 37 does not interfere with an effective disposition of the rod antenna 34.

The rod antenna 34, which is used for reception of an FM band radio signals, is disposed lengthwise within the vertical casing portion 22. Specifically, the rod antenna 34 in its telescoped condition extends along the mating surface 1d which represents the longer side of the tape recorder 1. As is well understood, the rod antenna 34 comprises a plurality of sections of different diameters which are telescoped together. The first section 34b of the antenna 34 is always maintained within the casing portion 22, and has its lower end secured to a mounting member 39 as by a nut 40. It is to be noted that the lower end of the first section 34b is located adjacent to, but closely spaced from, one end of the bar antenna 37 which is disposed within the horizontal casing portion, thus permitting an increased length of rod antenna 34. A second section 34c and subsequent sections of the rod antenna 34, except for a top 34a, are received within the first section 34b when the rod antenna is telescoped to its minimum length (see FIG. 1). The second section 34c has its lower end connected with the upper end of the first section 34b by means of support member 41. The support member 41 is freely rotatable relative to the first section 34b and is pivotally mounted on a connecting pin 41a connected with the second section 34c. The support member 41 is slidable within the first section 34b and its upward movement is blocked by suitable means at the top of the section 34b. Thus, when the second section 34c is fully withdrawn out of the vertical casing portion 22, the second section 34c and subsequent sections can be angularly moved through an angle of 90° or greater in any direction from the upright position shown in FIG. 4, thus allowing any orientation of the rod antenna. It should be understood that the support member 41 is not limited to the precise construction shown, but may be replaced by a ball articulated joint which permits an angular movement through an angle of 90° or greater in any direction. It will be seen that the maximum reception sensitivity can be assured, by locating the lower end of the first section 34b deep into the horizontal casing portion 21 to an extent which avoids an interference with the bar antenna 37, and by choosing a maximum length and a number of second and subsequent sections which can be received within the first section 34b.

As mentioned previously, by disposing the bar antenna 37 in the horizontal casing portion 21 and the rod antenna 34 in the vertical casing portion 22 of the L-shaped tuner casing which simultaneously abut against the two adjacent, mutually perpendicular sides of the tape recorder 1, the bar antenna 37 can be disposed along the surface 1e at a maximum spacing from this surface 1e while the rod antenna 34 in its telescoped condition can be disposed along the mating surface 1d of the tape recorder 1. The AM or FM radio set which is constituted by the combination of the tuner 20 and the tape recorder 1 has a length and a width which are greater than those of the tape recorder 1 by an amount corresponding to the width of the vertical casing portion and the horizontal casing portion, respectively, of the tuner 20. However, the general configuration is similar to that of the tape recorder 1, and hence facilitates its operation. The increased space is effectively utilized to house the bar antenna 37 and the rod antenna 34.

In use, the recorder 1 and the tuner 2 are disposed relative to each other so that the mating surfaces 1e, 21b are located opposite to each other and the mating surfaces 1d, 22c partly abut against each other, as illustrated in FIG. 2. When the tuner 20 is advanced forwardly or toward the recorder 1, the mating surface 22c slides along the mating surface 1d, and the tuner 20 comes to a stop when the mating surface 21b bears against the mating surface 1e. When the mutually perpendicular mating surfaces 1e, 1d of the tape recorder 1 are in abutment against the corresponding mating surfaces 21b, 22c of the tuner 20, detent piece 36 engages the corresponding detent piece 14 on the mating surface 1d while the threaded bolt 23 is aligned with the threaded bore 11 as are the groups of electrical contacts 13 and 25. When the knob 26 is now turned to screw the bolt 23 into the bore 11, both the tuner 20 and the tape recorder 1 are firmly coupled together, whereupon the groups of electrical contacts 13, 25 are brought into electrical contact with each other, thus achieving an interconnection of the electrical circuits (not shown) of both the tape recorder 1 and the tuner 20. In this manner, a source battery, a loudspeaker and an audio amplifier (not shown) which are internally housed within the tape recorder 1 can be used as part of the radio set.

When the switch 32 is now turned "ON", the lamp 29 is illuminated to indicate that the radio set is in operation. When receiving an AM band, the switch button 31 is thrown to the side indicated by "AM", and the knob 30 may be turned to choose a desired broadcasting frequency by bringing the pointer 27 into alignment with the indication of a desired frequency on the dial 28. Since the rod antenna 34 is not used in this instance, it is telescoped to its minimum length and remains received within the vertical casing portion 22 (see FIG. 1). Alternatively, when an FM band is to be received, the switch button 31 is thrown to the side designated "FM", and the rod antenna 34 is pulled out of the casing portion 22 by grasping the head 34a, and the knob turned to align the pointer 27 with a desired frequency indication on the FM scale of the dial 28. By manually holding the lower portion of the second section 34c which is now exposed externally, the rod antenna 34 can be angularly turned to a position where the reception sensitivity is at maximum.

When the radio set is not used, the switch 32 is thrown to its "OFF" position, permitting the operation of the tape recorder 1 alone.

In the embodiment described, the groups of electrical contacts 13, 25 are provided on the mating surfaces 1e, 21e. However, similar groups of electrical contacts may also be disposed in the mating surfaces 1d, 22c to increase the number of interconnection terminals.

In a modification, the casing portions 21, 22 can be constructed in a collapsible manner so that the both portions can be disposed one above another.

Also, it should be understood that by assembling a circuit into the tuner 20 which is used to receive an SW band, the rod antenna 34 can also be used as an SW antenna.

What is claimed is:

1. A radio tuner, comprising a casing including a pair of casing portions, attaching means for releasably attaching said radio tuner to a tape recorder so that each of said casing portions abuts a corresponding one of a pair of sides of a tape recorder which is releasably attached to said radio tuner by said attaching means, first antenna means housed within one of said pair of casing portions for receiving a first type of radio signal and second antenna means housed within the other of said pair of casing portions for receiving a second type of radio signal.

2. A radio tuner according to claim 1, wherein said one casing portion is longer than said other casing portion.

3. A radio tuner according to claim 2, wherein said one casing portion is substantially perpendicular to said other casing portion.

4. A radio tuner according to claim 3, wherein said casing is substantially L-shaped.

5. A radio tuner according to claim 4, wherein said first antenna means is a rod antenna which receives FM and SW radio signals.

6. A radio tuner according to claim 5, wherein said second antenna means is a ferrite bar antenna which receives AM radio signals.

7. A radio tuner according to claim 1, wherein said first antenna means is retractably received within said casing.

8. A radio tuner according to claim 7, wherein said first antenna means is telescopic.

9. A radio tuner according to claim 1, wherein said attaching means includes coupling means for releasably mechanically engaging a side of a tape recorder.

10. A radio tuner according to claim 9, wherein said coupling means is a threaded bolt rotatably mounted in said other casing portion and adapted to threadedly engage a bore provided in a side of a tape recorder.

11. A radio tuner according to claim 9, wherein said attaching means includes connecting means for releasably electrically connecting a tuner circuit contained within said casing to an electric circuit contained within a tape recorder.

12. A radio tuner according to claim 11, wherein said connecting means includes a plurality of electric contacts provided on said other casing portion, each of said electric contacts being adapted so as to mate with a corresponding one of a plurality of electric contacts provided on a tape recorder.

13. A radio tuner according to claim 12, wherein said one casing portion has a surface which is contiguous with an adjacent side of a tape recorder along the entire length thereof.

14. A radio tuner according to claim 13, wherein said first antenna means is longer than an adjacent side of a tape recorder.

15. A radio tuner according to claim 14, wherein said other casing portion has a surface which is contiguous with an adjacent side of a tape recorder along the entire length thereof.

16. A radio tuner according to claim 15, wherein said second antenna means is longer than an adjacent side of a tape recorder.

17. In combination, a tape recorder, having a generally rectangular shape, and a radio tuner which is electrically and mechanically connected to said tape recorder, said radio tuner comprising an L-shaped casing, the long leg of said casing being removably positioned adjacent to a long side of said tape recorder and the short leg of said casing being removably positioned adjacent to a short side of the tape recorder; a rod antenna retractably received within said long leg of said casing; and a bar antenna received within said short leg of said casing.

18. A combination according to claim 17, wherein said long leg and said short leg of said casing have a surface which mates with a corresponding adjacent surface of said long side and said short side, respectively, of said tape recorder.

* * * * *

UNITED STATES PATENT AND TRADEMARK OFFICE
CERTIFICATE OF CORRECTION

PATENT NO. : 4,233,686
DATED : November 11, 1980
INVENTOR(S) : Masaaki Sato

It is certified that error appears in the above—identified patent and that said Letters Patent is hereby corrected as shown below:

Column 2, line 51, change "a" (second occurrence) to --an--.

Column 2, line 52, delete the entire line, and substitute --individual to observe the running condition of a tape--.

Column 4, line 28, delete "by" (first occurrence).

Claim 13, line 14, change "12" to --11--.

Signed and Sealed this

Thirty-first Day of March 1981

[SEAL]

Attest:

RENE D. TEGTMEYER

Attesting Officer  Acting Commissioner of Patents and Trademarks